April 25, 1961 P. HOPP ET AL 2,981,018
ITEM INDICATING DEVICE
Filed Sept. 22, 1958 2 Sheets-Sheet 1

INVENTORS
PHILIP HOPP
HARRY H. LUTZ
BY Kane, Dalsimer and Kane
ATTORNEYS

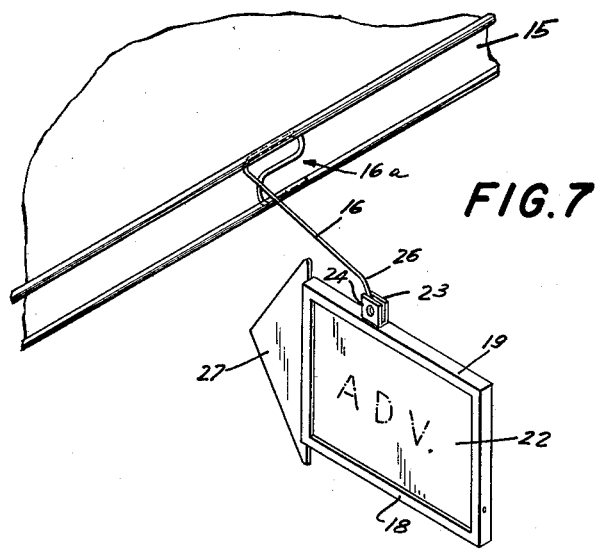
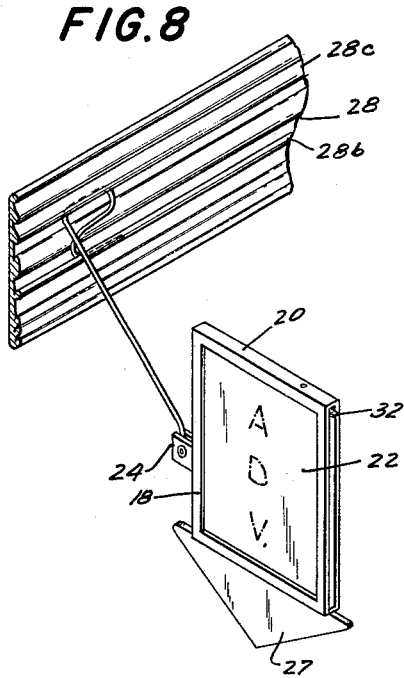
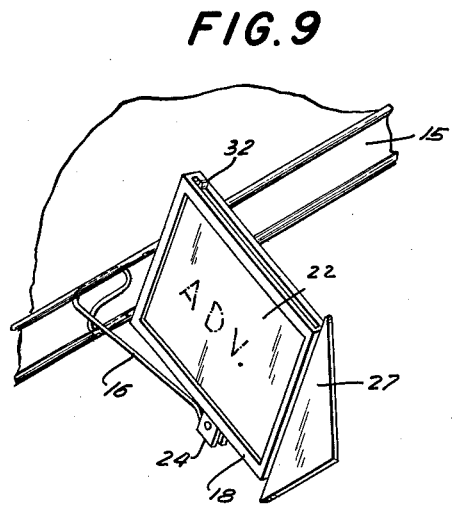

United States Patent Office 2,981,018
Patented Apr. 25, 1961

2,981,018

ITEM INDICATING DEVICE

Philip Hopp, New York, N.Y., and Harry Henrik Lutz, Haworth, N.J., assignors to The Hopp Press, Inc., New York, N.Y., a corporation of New York Filed Sept. 22, 1958, Ser. No. 762,347

3 Claims. (Cl. 40—16)

This invention relates generally to indicating devices used for directing attention to items located on shelves and in bins in stores.

In stores where products are sold directly to the consumer, such as in self-service markets, the goods for sale are generally placed on shelves or in bins and the customer can remove the item which he desires to purchase from the shelf or bin. Most store managers consider it desirable to indicate an item for sale at a location with its name and price so that shoppers can easily find the item.

Since items for purchase are located on shelves and in bins of various configurations, a variety of indicating devices have been developed and each store must have available several of the indicating devices in order to be able to invite attention to items at all locations. Also, some of the indicating devices now in use do not accurately identify the product location and therefore confuse the customer. An indicating device of this type, in order to be useful, must be easily mounted on readily available mountings within a store and be so designed that the price designation and the item designation can be easily changed when a different item is placed in the bin or on the shelf or the price changes.

The invention herein disclosed has as its principal object the furnishing of a new item indicating device which can be mounted to indicate items on a shelf or in a bin and which can be altered in position so that it can be utilized with bins and shelves of a variety of configurations.

Another object of this invention is to provide an item indicating device which can be easily inserted and removed from mountings which are readily available in stores.

A further object of this invention is to provide an item indicating device which is adapted to easily receive a variety of changeable inserts which are securely held in position to indicate items and prices.

An item indicating device embodying the invention and the manner of using the same is described herein with reference to the drawings in which:

Fig. 7 is a perspective view of an item indicating device which is the subject of this invention positioned to indicate items beneath and behind its mounting;

Fig. 8 is a perspective view of an item indicating device which is the subject of this invention positioned to indicate items directly beneath the body of the device; and Fig. 9 is a perspective view of an item indicating device which is the subject of this invention positioned to indicate items in front of the device.

Figure 1:
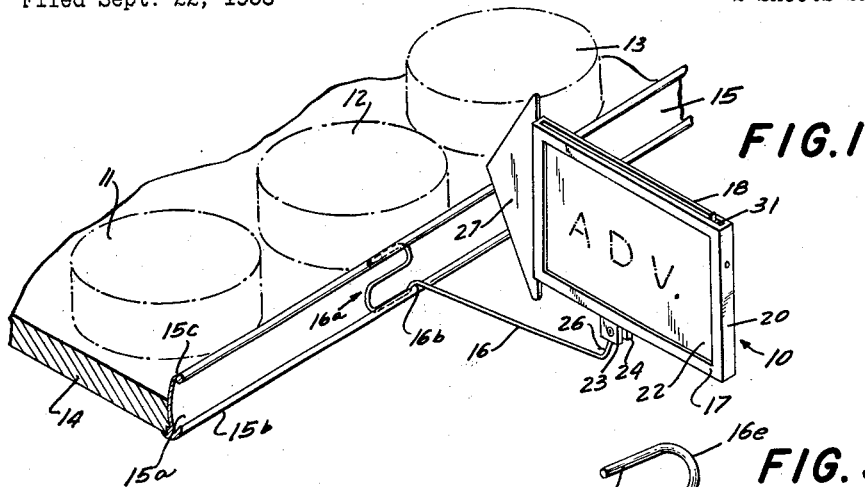
Fig. 1 is a perspective view of an item indicating device which is the subject of this invention and items indicated thereby.

An item indicating device which is constructed in accordance with the teachings of this invention is shown in Fig. 1 designated generally by the numeral 10, and is indicating the location of items 11, 12, and 13 which are similar items positioned upon shelf 14. Molding 15 is attached to shelf 14 at its front edge so that the channel portion thereof faces away from the shelf. The molding is a standard molding used in various markets and stores and this molding is the sole mounting means for item indicating device 10. Various configurations of molding may be used and as will become apparent below, the item indicating device can be mounted in a variety of ways and attached to shelves having no molding provided they are formed with a channel area as is molding 15.

Molding 15 is formed with an unobstructed surface 15a and two channel sides 15b and 15c which extend its length and each overlies an edge portion of surface 15a so that the end of resilient mounting wire 16 can be inserted therein. Wire 16 is stiff although resilient and has an end configuration 16a adapted to easily set in the channel formed in molding 15. End configuration 16a has a downwardly depending portion 16b which extends downwardly from wire 16 at an angle slightly greater than 90 degrees. Flat portion 16c extends perpendicularly from the end of portion 16b in a direction perpendicular to the plane defined by wire 16 and portion 16b. The remaining part of 16a is formed with two curved portions 16d and 16e which are joined by cross wire 16f. Configuration 16a terminates in end portion 16g.

Figure 3:
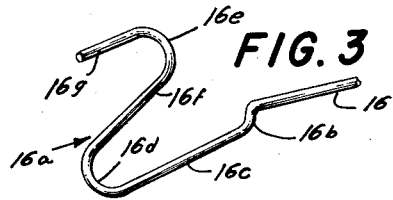
Fig. 3 is a segmentary perspective view of the mounting wire for the item indicating device shown in Fig. 1 removed from its mounting.
Figure 4:
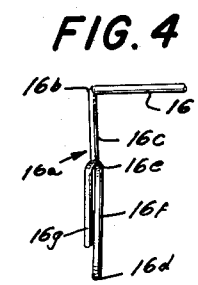
Fig. 4 is a segmentary side view of the mounting wire shown in Fig. 3.

In order to insert configuration 16a of the wire mounting in a molding as in Fig. 1, section 16c is first disposed adjacent surface 15a and side 15b of the molding. End portion 16g is easily disposed adjacent side 15c and surface 15a of the molding by depressing end configuration 16a so that end 16g is near 16c. The end configuration is then maintained in position in channel 15 due to the resiliency of the wire. When end configuration 16a is unmounted cross over portion 16f extends upwardly and forms an angle with flat portion 16c but when it is mounted the cross over portion 16f is substantially parallel with the flat portion 16c when both are adjacent surface 15a of molding 15. In the unmounted condition end portions 16g and 16f lie in the same plane and end portions 16b and 16c lie in another plane which makes an angle with the first plane as best seen in Figs. 3 and 4.

The body of the item indicating device is formed of plastic or any suitable material which is substantially rigid and consists of two rectangular frame members 17 and 18 joined at their bottom and side edges. Thus in the drawings the lower edge of frame member 17 is connected to the lower edge of frame 18 by bottom 19 and the side edges of frame 17 are coupled to the side edges of frame 18 by side members 20 and 20'. Each of the frames is rectangular and since their top edges are not joined a slot designated 21 has been formed in the uppermost portion of the frame. The frames form edges of U channel cross section with sides 20 and 20' and bottom 19. Thus bottom 19 forms the base of a U channel having sides of frame edges 17 and 18. Side 20 and side 21 each form the base of a U channel having sides of frame edges 17 and 18.

Figure 6:
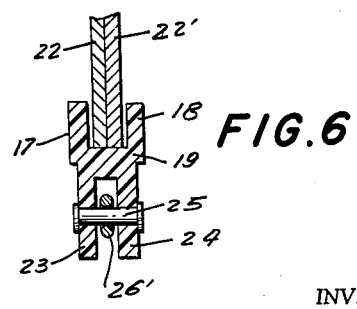
Fig. 6 is a segmentary view of the connection of the mounting wire to the body of the item indicating device.

Rectangular inserts such as 22 can be inserted into the body of the item indicating device through slot 21 to rest upon the upper surface of bottom member 19 so that it can be viewed from the side and appears framed by frame member 17 as seen in Fig. 1. Likewise the other side of insert 22 can be viewed as framed by frame member 18 or two inserts may be used; one specifically for framing by frame member 17 and the other for framing by frame member 18. Two inserts 22 and 23 are shown in Fig. 6.

Wire 16 is attached to the body of the item indicating device by means of frictional members 23 and 24 which depend from frames 17 and 18 respectively. These frictional members are formed of any suitable material and can be plastic and integral with the frames from which they depend. A rivet or shaft 25 extends from frictional member 23 to frictional member 24 serving as an axial mounting for angular end 26 of wire 16 which for this purpose is formed with a circular configuration 26′ which envelops the periphery of axis 25. End 26 of wire 16 is in effective engagement with the inner surfaces of frictional members 23 and 24 when circular portion 26′ is coiled around axis 25 so that the body of the item identification device is maintained in position with respect to wire 16 due to the frictional engagement of the inner surfaces of frictional members 23 and 24 with end 26 of wire 16.

The end 26 of wire 16 is parallel to the plane of end 16a of wire 16 and in the plane of wire 16 which also lies in the plane of the body of the item indicating device, so that the item identification device itself lies in a plane perpendicular to the plane of end 16a.

A triangular portion or arrow head 27 is attached to side edge 19 of the body of the item indicating device so that the indicating device has the appearance of an arrow pointing in a particular direction. Thus in Fig. 1 the item indicating device which is mounted in molding 15 by means of wire 16 appears to point toward items 11, 12 and 13 and insert 22 with the letters "ADV" are visible through frame 17.

Because of the relationship and configuration of the elements of the combination, the item indicating device can be utilized to designate items in various locations when it is attached to molding 15 allowing it to be used for a variety of installations. Thus in Fig. 7 the item indicating device is arranged to indicate items beneath shelf 14 and is attached to molding 15 in an inverted manner so that the body of the sign lies beneath mounting wire 16. Again, the sign body is maintained in position by the frictional engagement of the frictional facing members 23 and 24 with end 26 of wire 16. In this position of the item identification device, the insert 22 is inverted within the body of the device.

In Fig. 7 insert 22 is inverted within the frame so that the edge of insert 22 is adjacent bottom 19 of the item indicating device. The insert is maintained within the body of the indicating device and prevented from dropping through slot 21 by a lock means which will be described below.

In Fig. 8 the item indicating device is attached to molding 28 which is another conventional molding which differs slightly from molding 15, and which has side edges 28b and 28c which retains end portion 16a of wire 16. The body of the indicating device is positioned so that pointer 27 points downwardly to indicate an item directly beneath the body thereof. The body of the indicating device has been rotated about axis 25 from the position shown in Fig. 7 to the position shown in Fig. 8 and is maintained in the position shown in Fig. 8 by the frictional engagement of portion 26 of wire 16 with the surfaces of frictional members 23 and 24.

The rotation of the body of the identification device about axis 25 is accomplished manually merely by the user overcoming the force of the frictional engagement of end 26 with members 23 and 24 and rotating the body of the device until it attains the desired pointing position and then ceasing to rotate the body of the device about axis 25. The frictional engagement of members 23 and 24 with portion 26 of wire 16 is then sufficient to maintain the body in the position to which it has been manually brought.

In Fig. 9 the indicating device is in a position which indicates an item in front of it. In the positon shown in Fig. 9 the slot 21 of the indicating device appears at the top as in Fig. 1 so that the insert 22 is disposed within the device as in the position shown in Fig. 1 with the bottom of the insert resting on bottom 19. In the position shown in Fig. 8 a different insert which is designated generally by the numeral 29 is shown with its bottom surface resting upon side edge 19 of the item indicating device.

Figure 2:
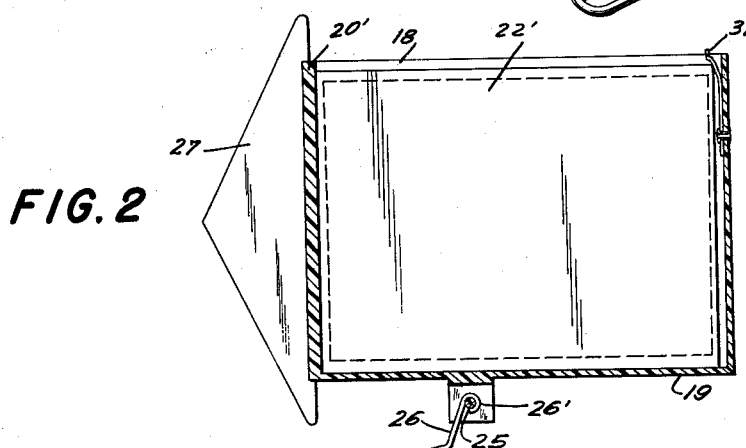
Fig. 2 is a partially sectional view taken along the device in its entirety.
Figure 5:
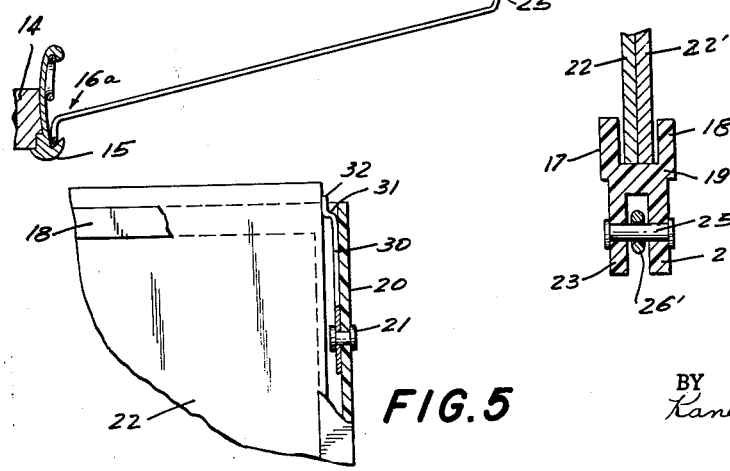
Fig. 5 is a segmentary view of the item indicating device shown in Fig. 1 illustrating an insert partially inserted within the body of the device and the insert locking device.

Insert 22 or 29 is retained within the body of the device in position in the frame no matter what position the device is in. This is accomplished by utilization of spring member 30 attached at one end to side edge 20 by means of rivet 21 as seen in Fig. 5. Member 30 can be formed of any resilient material and attached by any suitable means to edge 20. Member 30 is formed with retaining portion 31 and a handle portion 32 so that it can function properly for the use for which it is intended. In Fig. 2 member 30 retains insert 23 within frame 18 with its retaining portion above the upper edge of insert 23 so that insert 23 cannot fall out of and through slot 21 when the body of the item indicating device is inverted. The resiliency of member 30 insures that retaining portion 31 remains adjacent the upper edge of the insert.

In Figs. 7, 8 and 9 member 30 also helps to maintain the insert in position. In the position of the device shown in Fig. 7 retaining member 30 is essential for maintaining insert 22 within the body of the item indicating device because without retaining portion 31 of member 30 the insert 22 would be drawn by the force of gravity through slot 21 and out of the item indicating device.

Handle portion 32 of member 30 enables an operator to easily insert or withdraw an insert 22 from the body of the item indicating device. Handle portion 32, it is noted, projects beyond the body of the item indicating device so that it has a part extending out of slot 21. If it is desired to introduce an insert such as 22 in Fig. 5, the user grasps handle portion 32 and moves it to the right as shown in Fig. 5, so that the main portion of the member 30 lies adjacent edge 20 of the body of the item indicating device and retaining portion 31 of member 30 is removed from the edge of insert 22. The insert can then be removed and a new insert placed therein after which the resiliency of member 30 will bring member 30 to the position shown in Fig. 2 with the retaining portion thereof adjacent an edge of the insert so that the insert cannot be withdrawn from the body of the item indicating device unless the member 30 is again moved to the position shown in Fig. 5.

It is noted that the user initially moves body 30 adjacent edge 20 by means of handle portion 32 when the card insert is being positioned or withdrawn, however, once the side edge of the insert lies adjacent handle portion 32 it is unnecessary for the operator to hold the member 30 adjacent 20 since the side edge of the card insert does this itself. Also when inserting a card the user need not grasp handle 32 but can use handle portion 32 as a cam surface and cam the edge of the insert against it while the insert is being placed within the body of the device.

We have provided an item indicating device which can be used to indicate items in a variety of locations and which can be readily attached or removed from mounting which is available in stores. The item indicating device is adapted to receive a variety of inserts so that the insert can be changed to coincide with the item to which the item indicating device points and allows for placing a new insert within the body of the item indicating device if prices of the items indicated change. Also, as shown in Fig. 6, two inserts may be used, inserts 22 and 22', so that insert 22 is seen from one side as framed by frame 17 and insert 22' can be seen from the other side as framed by frame 18. This enables the use of two inserts each printed on one side only. Also, of course, a single insert can be used printed on either side.

Thus, among others, the several objects in the invention as specifically aforenoted, are achieved. Obviously, numerous changes in construction and re-arrangement of parts might be resorted to without departing from the spirit of the invention as defined by the claims.

We claim:

1. An item indicating device including in combination a body portion formed in the configuration of an arrow with a pointing head portion, a frictional surface of said body portion, a second frictional surface of said body portion spaced from said first surface an axial member supported at its ends at said frictional surfaces, a resilient mounting wire, a portion of said mounting wire surrounding said axial member for pivotal movement thereabout, a second portion of said mounting wire in frictional engagement with said first portion and a third portion of said mounting wire in frictional engagement with said second frictional surface whereby the mounting wire is prevented from rotating about the axial member.

2. A device of the character described including in combination a frame assembly to receive an indicia-displaying card, a pair of spaced members extending outwardly therefrom, a shaft supported between said members, a wire, means at one end of said wire enabling it to be attached to a mounting, the opposite end of said wire lying between said members, a coiled wire portion at such opposite end and extending around said shaft and frictionally engaging the adjacent surfaces of said members to restrain rotational movements of said frame assembly with respect to said wire.

3. In a device as defined in claim 2, said frame assembly providing ends and parts connecting said ends, said members extending outwardly from one of said parts at a point intermediate the ends thereof, said wire being formed with an angularly projecting part at a point adjacent said coiled end portion and a direction-indicating means secured to and extending outwardly from one of said ends of said frame assembly.

References Cited in the file of this patent

UNITED STATES PATENTS

| | | |
|---|---|---|
| 362,926 | Benninghaus | May 17, 1887 |
| 403,722 | Bailey | May 21, 1889 |
| 2,007,077 | Cox | July 2, 1935 |
| 2,027,086 | Brookey | Jan. 7, 1936 |
| 2,070,652 | Elmer | Feb. 16, 1937 |
| 2,850,820 | Lersch | Sept. 9, 1958 |